United States Patent
Furuya et al.

(10) Patent No.: US 8,693,009 B2
(45) Date of Patent: Apr. 8, 2014

(54) ROTATION AMOUNT DETECTING DEVICE FOR ROTATION BODY, LENGTH MEASURING DEVICE AND IMAGE FORMING APPARATUS

(75) Inventors: Takao Furuya, Ebina (JP); Yoshinari Iwaki, Ebina (JP); Minoru Ohshima, Ashigarakami-gun (JP); Michio Taniwaki, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 845 days.

(21) Appl. No.: 12/871,422

(22) Filed: Aug. 30, 2010

(65) Prior Publication Data

US 2011/0176158 A1    Jul. 21, 2011

(30) Foreign Application Priority Data

Jan. 21, 2010   (JP) ................................ 2010-011435

(51) Int. Cl.
*G06K 15/00*    (2006.01)

(52) U.S. Cl.
USPC .......... 358/1.12; 358/1.14; 358/1.13; 399/16; 399/44; 271/110; 271/97

(58) Field of Classification Search
USPC ......... 358/474, 1.12, 1.15, 1.14; 399/45, 389, 399/376, 66; 271/110, 97, 114
See application file for complete search history.

(56) References Cited

U.S. PATENT DOCUMENTS

| 4,547,810 | A | * | 10/1985 | Rutherford et al. | 358/409 |
| 5,678,127 | A | * | 10/1997 | Suga | 399/45 |
| 6,427,056 | B1 | * | 7/2002 | Kawano et al. | 399/67 |
| 6,633,396 | B1 | * | 10/2003 | Barry et al. | 358/1.14 |
| 6,707,513 | B2 | * | 3/2004 | Tsujimura et al. | 349/47 |
| 6,868,244 | B2 | * | 3/2005 | Koide | 399/167 |
| 7,532,370 | B2 | * | 5/2009 | Kudo et al. | 358/474 |
| 7,957,659 | B2 | * | 6/2011 | Nada et al. | 399/66 |
| 8,422,099 | B2 | * | 4/2013 | Murayama et al. | 358/498 |

FOREIGN PATENT DOCUMENTS

| JP | A-05-289554 | 11/1993 |
| JP | A-2003-171035 | 6/2003 |
| JP | A-2010-134093 | 6/2010 |

* cited by examiner

*Primary Examiner* — Negussie Worku
(74) *Attorney, Agent, or Firm* — Oliff PLC

(57) ABSTRACT

A rotation amount detecting device for a rotation body includes: a first rotation body having a first surface; a second rotation body having a second surface formed of a material different from that of the first surface and contacting the first surface, and rotating with rotation of the first rotation body; a first support member rotatably supporting the first rotation body at a first position and supporting thereof to be swingable around a first axis at a position different from the first position; a second support member rotatably supporting the second rotation body at a second position and supporting thereof to be swingable around a second axis provided at a position different from the second position, the second axis being the first axis or an axis in the first support member other than the first axis; and a detector that detects a rotation amount of the second rotation body.

13 Claims, 11 Drawing Sheets

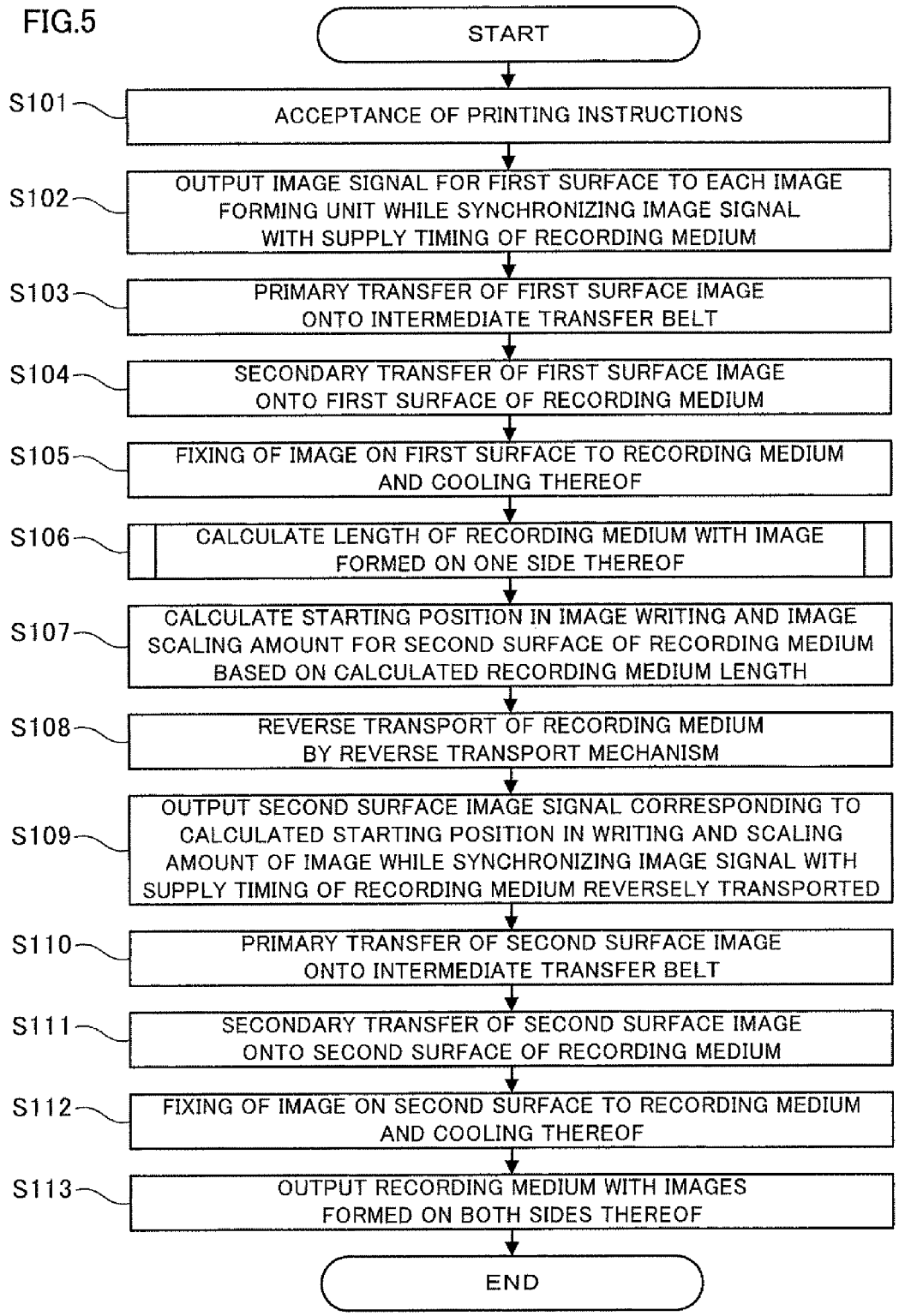

FIG.5

START

S101 — ACCEPTANCE OF PRINTING INSTRUCTIONS

S102 — OUTPUT IMAGE SIGNAL FOR FIRST SURFACE TO EACH IMAGE FORMING UNIT WHILE SYNCHRONIZING IMAGE SIGNAL WITH SUPPLY TIMING OF RECORDING MEDIUM

S103 — PRIMARY TRANSFER OF FIRST SURFACE IMAGE ONTO INTERMEDIATE TRANSFER BELT

S104 — SECONDARY TRANSFER OF FIRST SURFACE IMAGE ONTO FIRST SURFACE OF RECORDING MEDIUM

S105 — FIXING OF IMAGE ON FIRST SURFACE TO RECORDING MEDIUM AND COOLING THEREOF

S106 — CALCULATE LENGTH OF RECORDING MEDIUM WITH IMAGE FORMED ON ONE SIDE THEREOF

S107 — CALCULATE STARTING POSITION IN IMAGE WRITING AND IMAGE SCALING AMOUNT FOR SECOND SURFACE OF RECORDING MEDIUM BASED ON CALCULATED RECORDING MEDIUM LENGTH

S108 — REVERSE TRANSPORT OF RECORDING MEDIUM BY REVERSE TRANSPORT MECHANISM

S109 — OUTPUT SECOND SURFACE IMAGE SIGNAL CORRESPONDING TO CALCULATED STARTING POSITION IN WRITING AND SCALING AMOUNT OF IMAGE WHILE SYNCHRONIZING IMAGE SIGNAL WITH SUPPLY TIMING OF RECORDING MEDIUM REVERSELY TRANSPORTED

S110 — PRIMARY TRANSFER OF SECOND SURFACE IMAGE ONTO INTERMEDIATE TRANSFER BELT

S111 — SECONDARY TRANSFER OF SECOND SURFACE IMAGE ONTO SECOND SURFACE OF RECORDING MEDIUM

S112 — FIXING OF IMAGE ON SECOND SURFACE TO RECORDING MEDIUM AND COOLING THEREOF

S113 — OUTPUT RECORDING MEDIUM WITH IMAGES FORMED ON BOTH SIDES THEREOF

END

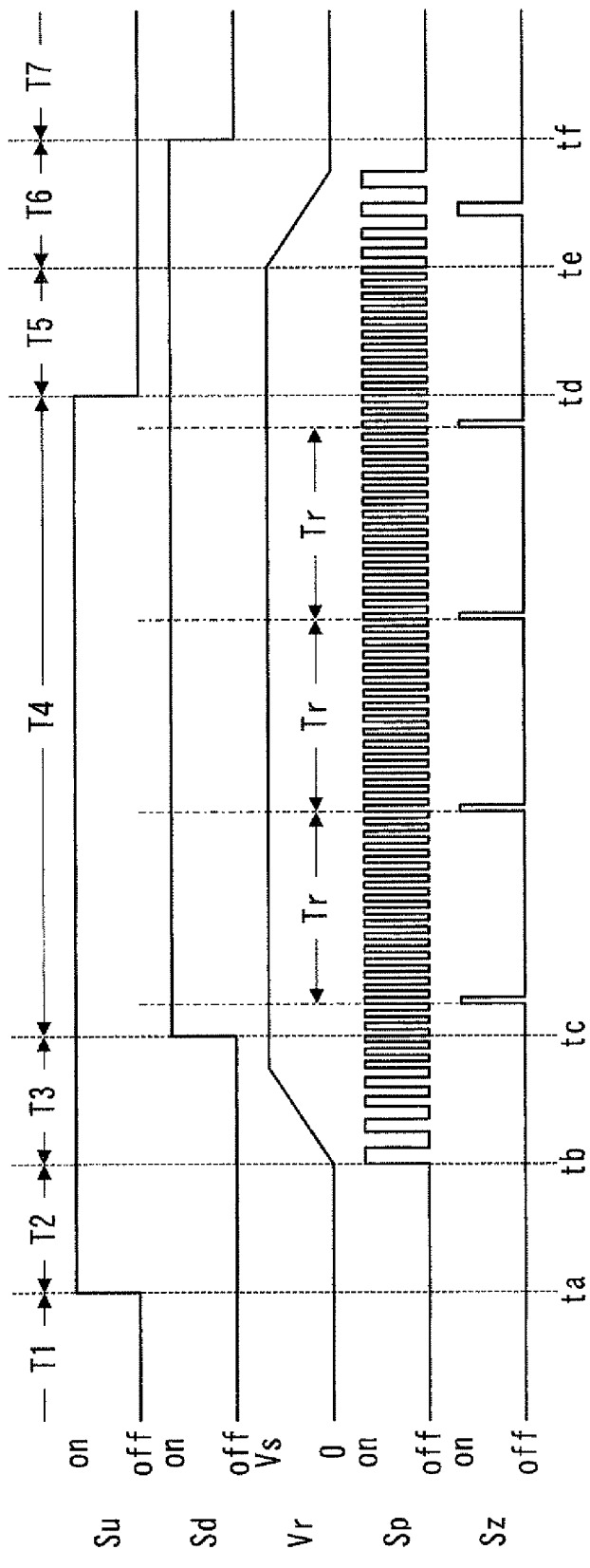
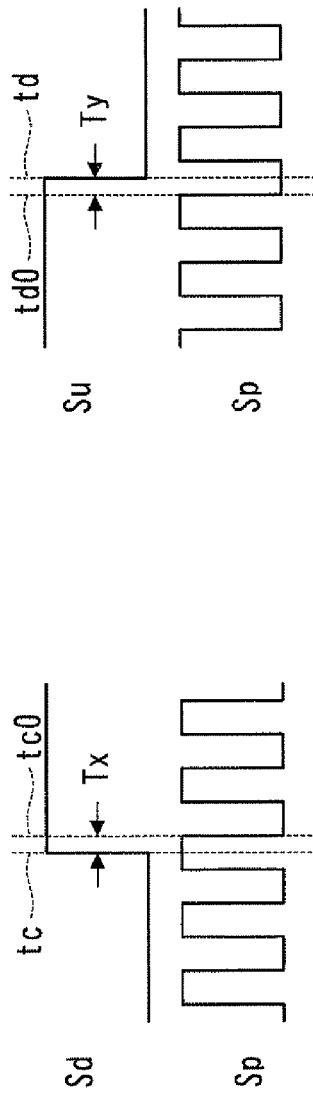
FIG.6A
FIG.6B
FIG.6C

ROTATION AMOUNT DETECTING DEVICE FOR ROTATION BODY, LENGTH MEASURING DEVICE AND IMAGE FORMING APPARATUS

CROSS REFERENCE TO RELATED APPLICATIONS

This application is based on and claims priority under 35 USC §119 from Japanese Patent Application No. 2010-011435 filed Jan. 21, 2010.

BACKGROUND

1. Technical Field

The present invention relates to a rotation amount detecting device for a rotation body, a length measuring device that measures a length of a sheet in a transport direction thereof and an image forming apparatus.

2. Related Art

Recently, a printer or a copying machine which is capable of detecting a transport speed of a recording medium or a length in a transport direction of a recording medium using a rotation body has been known.

SUMMARY

According to an aspect of the present invention, there is provided a rotation amount detecting device for a rotation body, including: a first rotation body provided with a first circumferential surface portion being in contact with a sheet being transported, the first rotation body rotating along with transportation of the sheet; a second rotation body provided with a second circumferential surface portion formed of a material different from a material forming the first circumferential surface portion and being in contact with the first circumferential surface portion, the second rotation body rotating along with rotation of the first rotation body; a first support member that rotatably supports the first rotation body at a first support position and swingably supports the first rotation body to swing around a first axis provided at a position different from the first support position of the first rotation body; a second support member that rotatably supports the second rotation body at a second support position and swingably supports the second rotation body to swing around a second axis provided at a position different from the second support position of the second rotation body, the second axis being any one of an axis provided to the first support member other than the first axis and an axis that is the same as the first axis; and a detector that detects an amount of rotation of the second rotation body.

BRIEF DESCRIPTION OF THE DRAWINGS

Exemplary embodiments of the present invention will be described in detail based on the following figures, wherein:

FIG. 5 is a flowchart illustrating an example of processing of the controller in a case where image formation is carried out on both sides of a recording medium using the image forming apparatus;

FIGS. 6A to 6C are timing charts illustrating an example of a relationship between a roll speed of a second roll that rotates along with passing through of the recording medium and various signals outputted by the length measuring device;

DETAILED DESCRIPTION

Hereinafter, exemplary embodiments according to the present invention will be described in detail with reference to the accompanying drawings.

<First Exemplary Embodiment>

Figure 1:
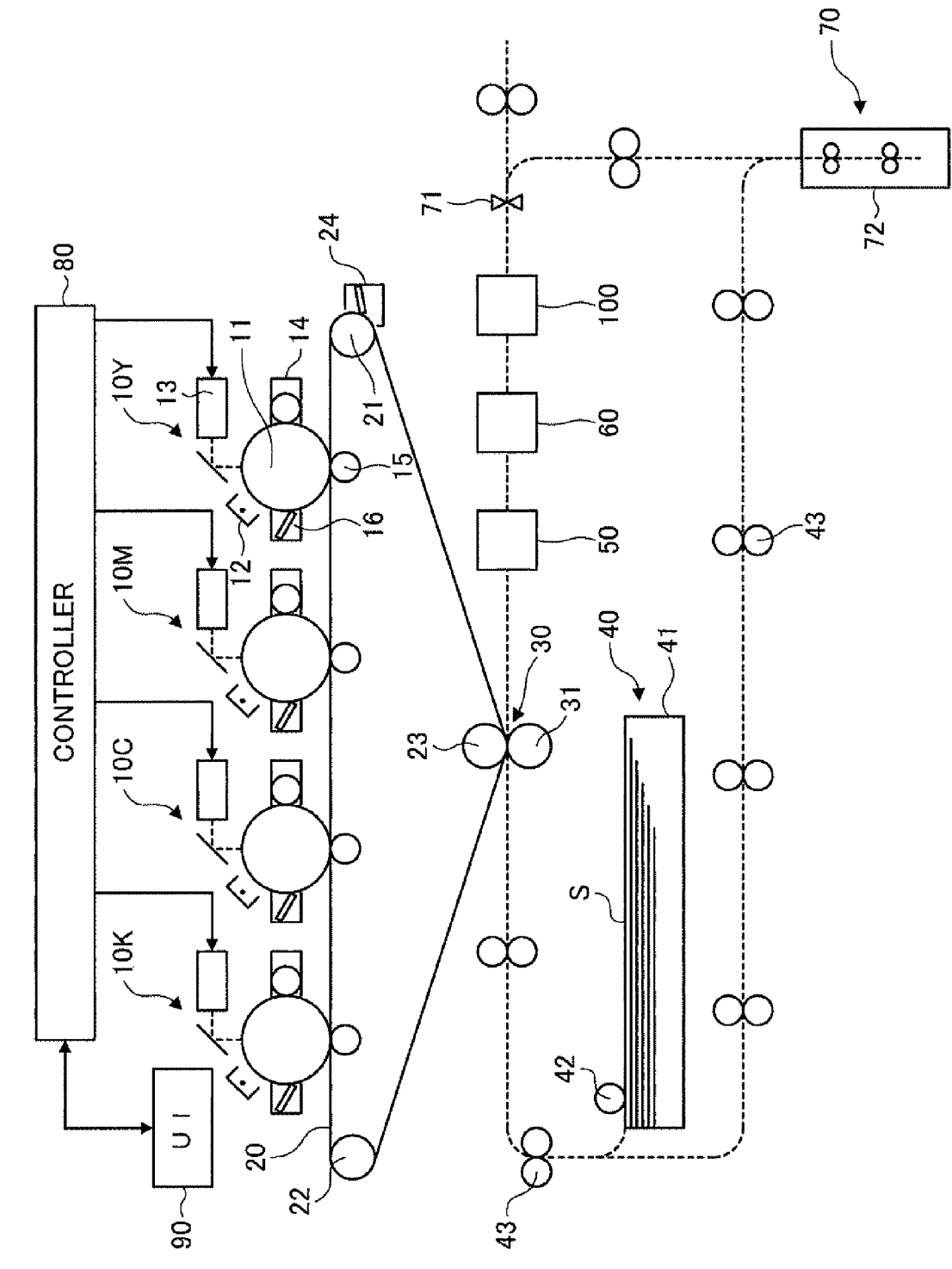
FIG. 1 is a schematic block diagram illustrating an example of an image forming apparatus to which a first exemplary embodiment is applied.

FIG. 1 is a schematic block diagram illustrating an example of an image forming apparatus to which the first exemplary embodiment is applied. The image forming apparatus shown in FIG. 1 has a configuration of a so-called "tandem-type" and includes plural image forming units 10 (10Y, 10M, 10C and 10K) in which toner images of respective colors are formed by, for example, an electrophotographic system. The image forming apparatus also includes an intermediate transfer belt 20 on which the toner images of the respective color components formed by the respective image forming units 10 as an example of an image forming unit are sequentially transferred (primary transfer) and retained, and a secondary transfer device 30 that collectively transfers the superimposed image having been transferred on the intermediate transfer belt 20 onto a recording medium S. Further, the image forming apparatus includes a recording medium supplier 40 that supplies the recording medium S to the secondary transfer device 30, a fixing device 50 that fixes the image having been secondarily transferred by the secondary transfer device 30 onto the recording medium S with heat and pressure, and a cooling device 60 that cools the recording medium S on which the image has been fixed.

Each of the image forming units 10 includes: a photoconductor drum 11 that is rotatably attached; a charging device 12 provided around the photoconductor drum 11 to charge the photoconductor drum 11; an exposure device 13 that exposes the photoconductor drum 11 to write an electrostatic latent image thereon; a developing device 14 that visualizes the electrostatic latent image on the photoconductor drum 11 with toner; a primary transfer device 15 that transfers the toner image of each color component formed on the photoconductor drum 11 onto the intermediate transfer belt 20; and a drum cleaner 16 that removes residual toner on the photoconductor drum 11. It should be noted that each of the image forming units 10 is referred to as a yellow image forming unit 10Y, a magenta image forming unit 10M, a cyan image forming unit 10C and a black image forming unit 10K in the following description.

The intermediate transfer belt 20 is configured to loop over three roll members 21 to 23 to rotate. Among the roll members, the roll member 22 is configured to drive the intermediate transfer belt 20. The roll member 23 is arranged to face a secondary transfer roll 31 with the intermediate transfer belt 20 interposed therebetween, thus the secondary transfer device 30 is constituted by the secondary transfer roll 31 and the roll member 23. A belt cleaner 24 that removes residual toner on the intermediate transfer belt 20 is provided at a position facing the roll member 21 with the intermediate transfer belt 20 interposed therebetween.

The recording medium supplier 40 includes a recording medium container 41 that contains the recording medium S and a take up roll 42 that takes up and transports the recording medium S contained in the recording medium container 41. A transport path of the recording medium S supplied from the recording medium supplier 40 is provided with plural transport rolls 43. It should be noted that materials constituting the recording medium S, as an example of a sheet, may be configured with various kinds of paper materials as a matter of course. Other than the paper materials, the medium may be formed of resin used for OHP transparencies, for example, or configured with a paper material having a resin film coating on a surface thereof.

The fixing device 50 includes a heat source that heats the recording medium S. In the first exemplary embodiment, an image transferred onto the recording medium S is fixed by applying heat and pressure.

The cooling device 60 has a function of cooling the recording medium S heated by the fixing device 50, and may employ a configuration such that, for example, two metal rolls are arranged to catch the recording medium S therebetween, and the recording medium S passes between the rolls while being in contact with the rolls.

Here, the image forming apparatus in the first exemplary embodiment is configured to be capable of, in addition to forming an image on one surface of the recording medium S supplied from the recording medium supplier 40, reversing and transporting the recording medium on one side surface of which the image has been formed, thereby forming an image on the other side surface of the recording medium S. Accordingly, the image forming apparatus includes a reverse transport mechanism 70. The reverse transport mechanism 70 reverses the sides of the recording medium S having passed through the fixing device 50 and the cooling device 60 and leading and trailing ends in the transport direction thereof, and returns the recording medium S to the secondary transfer device 30 again. The reverse transport mechanism 70 is provided downstream of the cooling device 60 in the transport direction of the recording medium S and includes a switching device 71 that switches a proceeding direction of the recording medium S between a transport path for outputting the recording medium S to the outside of the image forming apparatus and a transport path for reverse transporting. The reverse transport mechanism 70 further includes a reversing device 72, provided within the transport path for reverse transporting, which reverses the sides of the recording medium S heading for the secondary transfer device 30 again by reversing the transport direction of the recording medium S. It should be noted that plural rolls 43 are also mounted to the transport path for reverse transporting of the recording medium S.

The image forming apparatus of the first exemplary embodiment further includes a length measuring device 100 provided downstream of the cooling device 60 and upstream of the switching device 71 in the transport direction of the recording medium S, which measures the length in the transport direction of the recording medium S transported from the cooling device 60. The position to which the length measuring device 100 is attached is not limited to the above-described location, but the length measuring device 100 may be attached to the transport path for reverse transporting of the recording medium S.

The image forming apparatus further includes a controller 80 that controls operations of the devices and parts constituting the image forming apparatus, and a user interface (UI) 90 that outputs instructions from a user to the controller 80 and provides instructions received from the controller 80 to a user via a screen or the like not shown in the figure.

Figure 2:
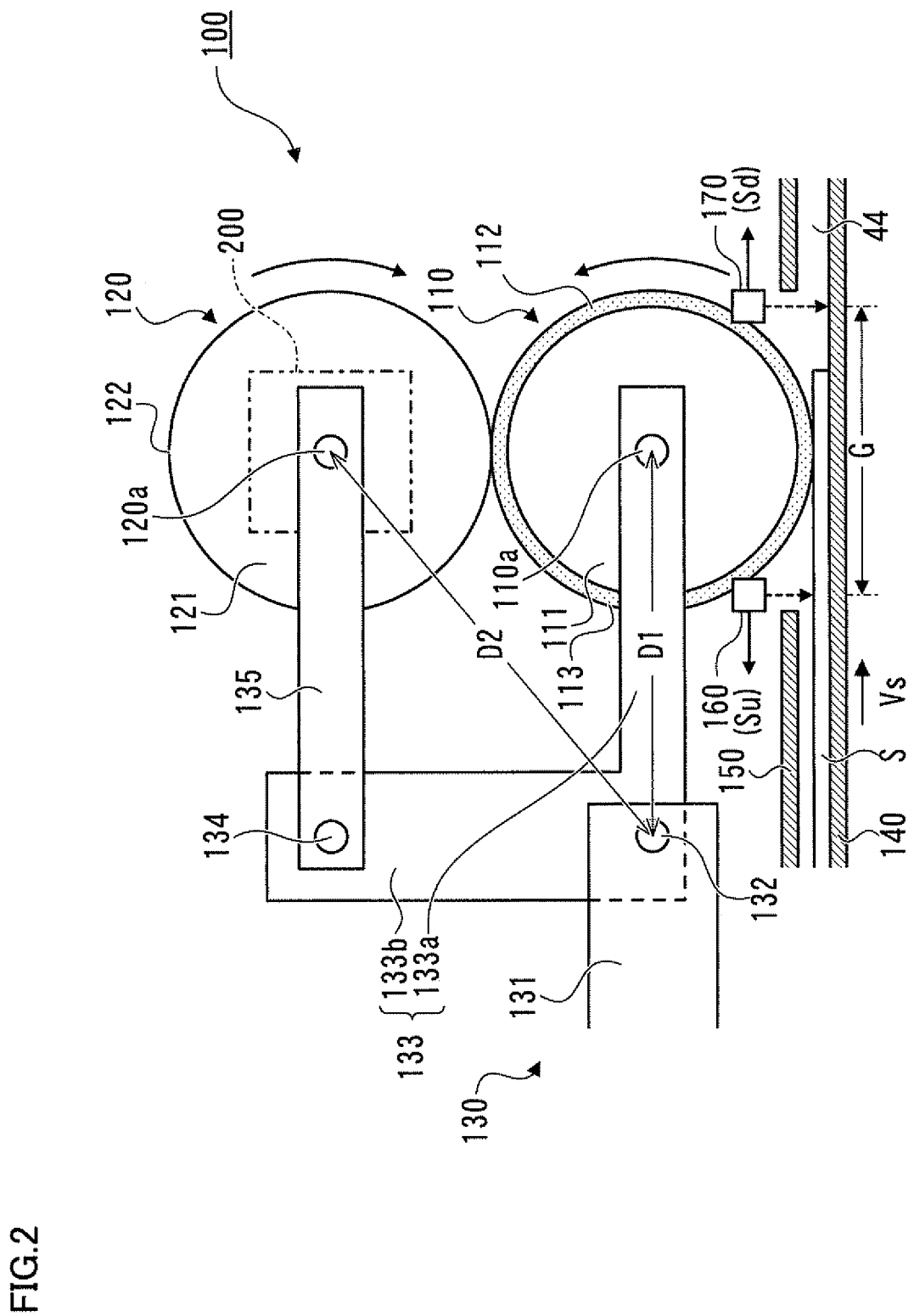
FIG. 2 is a schematic block diagram illustrating an example of a length measuring device used in the first exemplary embodiment.

FIG. 2 is a schematic block diagram illustrating an example of the length measuring device 100 provided to the image forming apparatus shown in FIG. 1, which is used for measuring the length in a transport direction of the recording medium S being transported.

The length measuring device 100 includes: a first roll 110 that rotates around a first rotation axis 110a above a transport path 44; a second roll 120 that rotates, above the first roll 110, around a second rotation axis 120a while being in contact with the first roll 110; a support mechanism 130 that supports the first roll 110 and the second roll 120; and a rotation amount detector 200 that is attached to the second rotation axis 120a of the second roll 120 and detects the rotation amount of the second roll 120.

The first roll 110 as an example of a first rotation body includes a first roll main body 111 provided around the first rotation axis 110a, and a surface layer 112 formed on an outer circumferential surface of the first roll main body 111. On the outer circumferential surface of the first roll 110, a first circumferential surface portion 113 constituted by the surface layer 112 is formed. In the first exemplary embodiment, both of the first roll main body 111 and the surface layer 112 are constituted by an elastic body such as rubber, the hardness of the surface layer 112 being set higher than that of the first roll main body 111. It should be noted that, in the first exemplary embodiment, a two-Player configuration roll is used as the first roll 110, but a roll of a single-layer configuration or configuration of three or more layers may also be used. The first roll main body 111 and the surface layer 112 may be configured with, for example, a plastic, other than rubber, and may be configured with different materials. Moreover, the first roll main body 111 may be configured with a metal such as aluminum.

The second roll 120 as an example of a second rotation body has a second roll main body 121 configured with, for example, a metal such as aluminum, which includes an outer circumferential surface thereof. On the outer circumferential surface of the second roll 120, a second circumferential surface portion 122 constituted by the second roll main body 121 is formed.

In such a manner, in the first exemplary embodiment, the first circumferential surface portion 113 of the first roll 110 that comes into contact with the recording medium S being transported is configured with rubber having a higher coefficient of friction than a metal, meanwhile the second circumferential surface portion 122 of the second roll 120 that comes into contact with the first circumferential surface portion 113 of the first roll 110 is configured with a metal having a lower thermal coefficient of expansion than rubber.

The support mechanism 130 of the first exemplary embodiment includes a first lever 133 that swings around a first swing axis 132 extending in the same direction as the first rotation axis 110a and the second rotation axis 120a, the first swing axis 132 being provided upstream of the first roll 110 in the transport direction of the recording medium S and above the transport path 44. The first swing axis 132 as an example of a first axis is swingably supported by the support body 131 fastened to a housing (not shown in the figure) of the length measuring device 100. The first lever 133 as an example of a first support member has an L shape and includes, as shown in FIG. 2, a first arm 133a that extends along the transport direction of the recording medium S from the first swing axis 132 and a second arm 133b that extends upwardly, namely, away from the recording medium 5, from the first swing axis 132. Among these arms, on a top end side of the first arm 133a, the first rotation axis 110a of the first roll 110 is rotatably attached. On the other hand, on a top end side of the second arm 133b, a second lever 135 that is swingable around a second swing axis 134, as an example of a second axis, is attached. In FIG. 2, the second lever 135 as an example of a second support member extends along the transport direction of the recording medium S from the second swing axis 134 and the second rotation axis 120a of the second roll 120 is rotatably attached on a top end side of the second lever 135. It should be noted that the support mechanism 130 may be configured to be located below the transport path 44, thus causing the first roll 110 to come into contact with the recording medium S from beneath.

In this manner, the first roll 110 is configured to swing around the first swing axis 132 via the first arm 133a of the first lever 133. The second roll 120 is configured to swing around the first swing axis 132 via the second arm 133b of the first lever 133, the second swing axis 134 and the second lever 135. Accordingly, in the length measuring device 100 of the first exemplary embodiment, the first roll 110 and the second roll 120 are configured to swing around the first swing axis 132.

In the first exemplary embodiment, a spring (not shown in the figure) is provided to the second arm 133b of the first lever 133 to apply a force in the clockwise direction in the figure around the first swing axis 132. In the first exemplary embodiment, another spring (not shown in the figure is also provided to the second lever 135 to apply a force in the clockwise direction in the figure around the second swing axis 134. In the first exemplary embodiment, the first roll 110 is pressed against the transport path 44 (and the recording medium S transported inside the transport path 44) by the force applied to the second arm 133b by the spring. Further, the second roll 120 is pressed against the first roll 110 by the force applied to the second lever 135 by the spring. In the first exemplary embodiment, the first roll 110 comes into contact with the recording medium S being transported, and thereby the first roll 110 rotates to follow the movement of the recording medium S. The second roll 120 is brought into contact with the first roll 110, thus causing the second roll 120 to rotate to follow the rotation of the first roll 110, and detecting an amount of rotation of the second roll 120 by the rotation amount detector 200.

The transport path 44 for transporting the recording medium S is formed by a lower side guide member 140 and an upper side guide member 150 that are arranged to face each other with a space of a predetermined dimension interposed therebetween. Each of the lower side guide member 140 and the upper side guide member 150 has a plate shape and a function of guiding the recording medium S being transported and regulating the moving direction of the recording medium S. In the first exemplary embodiment, the recording medium S is transported within the transport path 44 while being in contact with the lower side guide member 140, and regulated by the upper side guide member 150 not to be displaced upwardly. However, the transport path 44 is formed to include a space broader than the largest thickness of the recording medium S that may be used by the image forming apparatus shown in FIG. 1, thereby allowing a gap between the recording medium S and the lower side guide member 140 or the upper side guide member 150. It should be noted that the upper side guide member 150 is removed at a location where the first roll 110 is attached, to expose the transport path 44 and the recording medium S transported within the transport path 44.

Further, the length measuring device 100 includes an upstream side detecting sensor 160 that detects passing of a leading edge and a trailing edge of the recording medium S in the transport direction thereof on the upstream side, in the transport direction of the recording medium S, of a location where the first roll 110 and the recording medium S (or the lower side guide member 140) come into contact with each other, and a downstream side detecting sensor 170 that detects passing of the leading edge and the trailing edge of the recording medium S in the transport direction thereof on the downstream side, in the transport direction of the recording medium S, of the location where the first roll 110 and the recording medium S (or the lower side guide member 140) come into contact with each other. In the first exemplary embodiment, each of the upstream side detecting sensor 160 and the downstream side detecting sensor 170 is an optoelectronic detector constituted by an LED (Light Emitting Diode) and a photosensor and optically detects the recording medium S that is transported passing through the detecting position. Accordingly, each of the upstream side detecting sensor 160 and the downstream side detecting sensor 170 is mounted, at a location where the upper side guide member 150 is not provided, to face the lower side guide member 140. The upstream side detecting sensor 160 and the downstream side detecting sensor 170 output an upstream side edge signal Su and a downstream side edge signal Sd, respectively. Hereinafter, the distance between the detecting position of the recording medium S by the upstream side detecting sensor 160 and the detecting position of the recording medium S by the downstream side detecting sensor 170 is referred to as a gap G. Further, in the image forming apparatus shown in FIG. 1, the recording medium S is transported within the transport path 44 at a predetermined speed, and the set speed of the recording medium S is referred to as a recording medium transport speed Vs. In some cases, the recording medium transport speed Vs is changed depending on the type or thickness of the recording medium S, for example.

It should be noted that the lower side guide member 140 which is secured is arranged to face the first roll 110 in the first exemplary embodiment, however, a roll member rotatably provided may be arranged to face the first roll 110.

Figure 3:
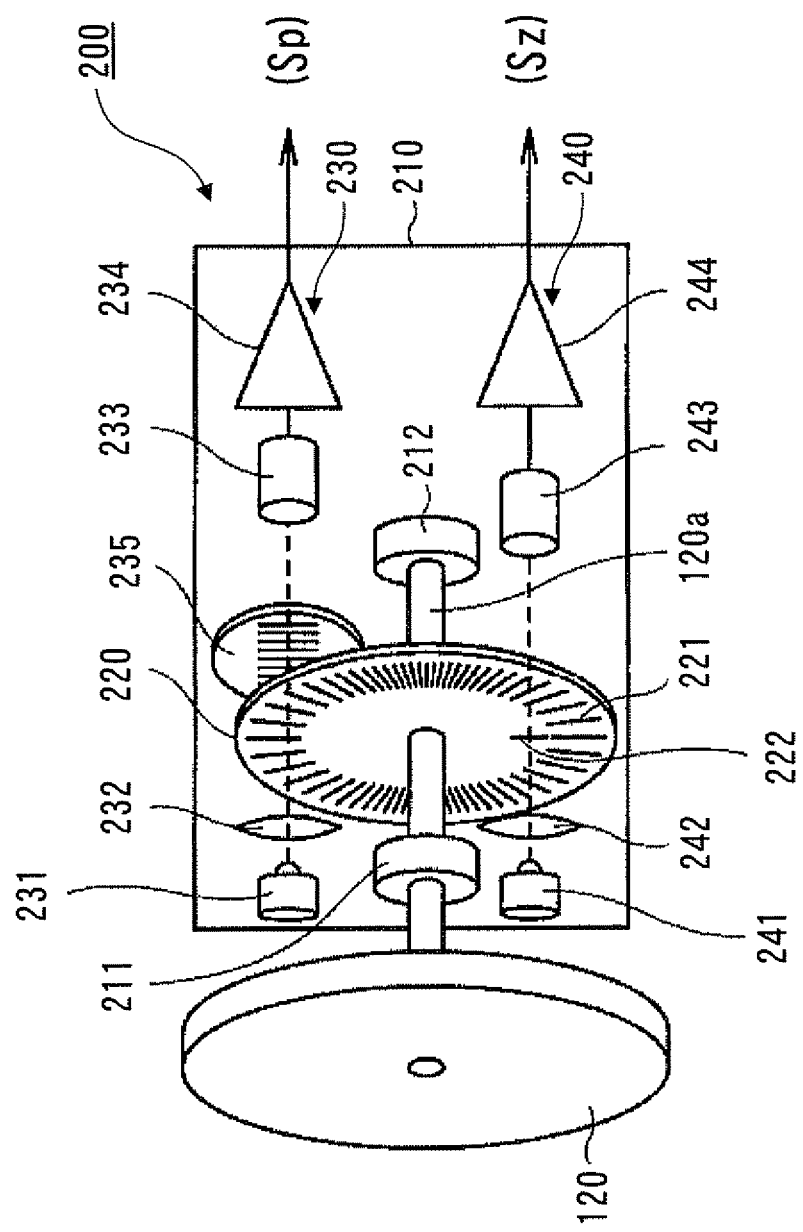
FIG. 3 is a schematic block diagram illustrating an example of a rotation amount detector used in the first exemplary embodiment.

FIG. 3 is a schematic block diagram illustrating an example of the rotation amount detector 200 provided to the length measuring device 100 shown in FIG. 2, which detects an amount of rotation of the second roll 120 via the second rotation axis 120a. The rotation amount detector 200 is provided to share the second rotation axis 120a with the second roll 120 on one end side thereof, and configured to swing together with the second roll 120 when the first lever 133 and the second lever 135 shown in FIG. 2 swing.

The rotation amount detector 200 as an example of a detector has a rectangular shape, for example, and includes therein: a housing 210 into which the second rotation axis 120a of the second roll 120 is inserted; two bearings 211 and 212 that are secured to the housing 210 inside thereof to rotatably support the second rotation axis 120a, and a slit circular plate 220 that is a circular plate attached to the second rotation axis 120a while being secured thereto inside the housing 210, in which plural slits are radially formed as described later.

The slit circular plate 220 is formed of glass, for example. The slit circular plate 220 is provided with plural first slits 221 that are formed in the circumferential direction at regular intervals and penetrate both sides of the slit circular plate 220, and a second slit 222 that is formed inside of the first slits 221 in the radial direction, where only one second slit 222 is formed in the circumferential direction.

The rotation amount detector 200 further includes a first slit detector 230 that detects passing of each of the first slits 221 when the slit circular plate 220 rotates along with the rotation of the second roll 120 and the second rotation axis 120a, and a second slit detector 240 that detects passing of the second slit 222. The first slit detector 230 and the second slit detector 240 are contained in the housing 210.

Among these slit detectors, the first slit detector 230 includes: a first light-emitting element 231 that emits light toward a limb portion of the slit circular plate 220, namely, the location where the plural first slits 221 are formed; a first lens 232 that gathers light emitted from the first light-emitting element 231 toward the slit circular plate 220; a secure slit 235 arranged on an optical axis of light that is emitted from the first light-emitting element 231 and passes through the first slits 221 provided on the slit circular plate 220; a first light-receiving element 233 that receives light passing through the first slits 221 provided on the slit circular plate 220 and the secure slit 235; and a first amplifier 234 that amplifies an output signal from the first light-receiving element 233.

On the other hand, the second slit detector 240 includes: a second light-emitting element 241 that emits light toward the location, which is provided inside of the limb portion of the slit circular plate 220, where the single second slit 222 is formed; a second lens 242 that gathers light emitted from the second light-emitting element 241 toward the slit circular plate 220; a second light-receiving element 243 that receives light emitted from the second light-emitting element 241 and passing through the second slit 222 provided on the slit circular plate 220; and a second amplifier 244 that amplifies an output signal from the second light-receiving element 243.

Among these components, each of the first light-emitting element 231 and the second light-emitting element 241 is configured with a light emitting diode (LED), for example, and each of the first light-receiving element 233 and the second light-receiving element 243 is configured with a photodiode (PD), for example.

In the rotation amount detector 200, the first light-receiving element 233 intermittently receives light emitted from the first light-emitting element 231. The light is finely split on a time base by the first slits 221 provided on the slit circular plate 220 in accordance with the rotation of the slit circular plate 220 along with the rotation of the second roll 120, and passes through the first slits 221 and the secure slit 235. The first light-receiving element 233 then outputs a pulse waveform corresponding to timing of the received light as the output signal. The first amplifier 234 outputs a phase signal Sp obtained by amplifying the output signal to the controller 80 (refer to FIG. 1) provided in the image forming apparatus.

On the other hand, in the rotation amount detector 200, the second light-receiving element 243 receives light passing through the second slit 222 only once per every single rotation of the second roll 120, and outputs a pulse waveform corresponding to timing of the received light as the output signal. The second amplifier 244 outputs a Z-phase signal Sz obtained by amplifying the output signal to the controller 80 (refer to FIG. 1) provided in the image forming apparatus.

It should be noted that a rotary encoder of a so-called "incremental-type" is used in the first exemplary embodiment, however, as long as the amount of rotation of the second roll 120 may be measured with a unit of less than one circle $\{2n(\text{rad})\}$, any rotary encoder may be employed. As such a device, a rotary encoder of, for example, an absolute type may be provided. Further, in the first exemplary embodiment, the rotation amount detector 200 is configured to employ a light amount variation, but the rotation amount detector is not limited thereto, and a magnetic variation, for example, may be employed.

Figure 4:
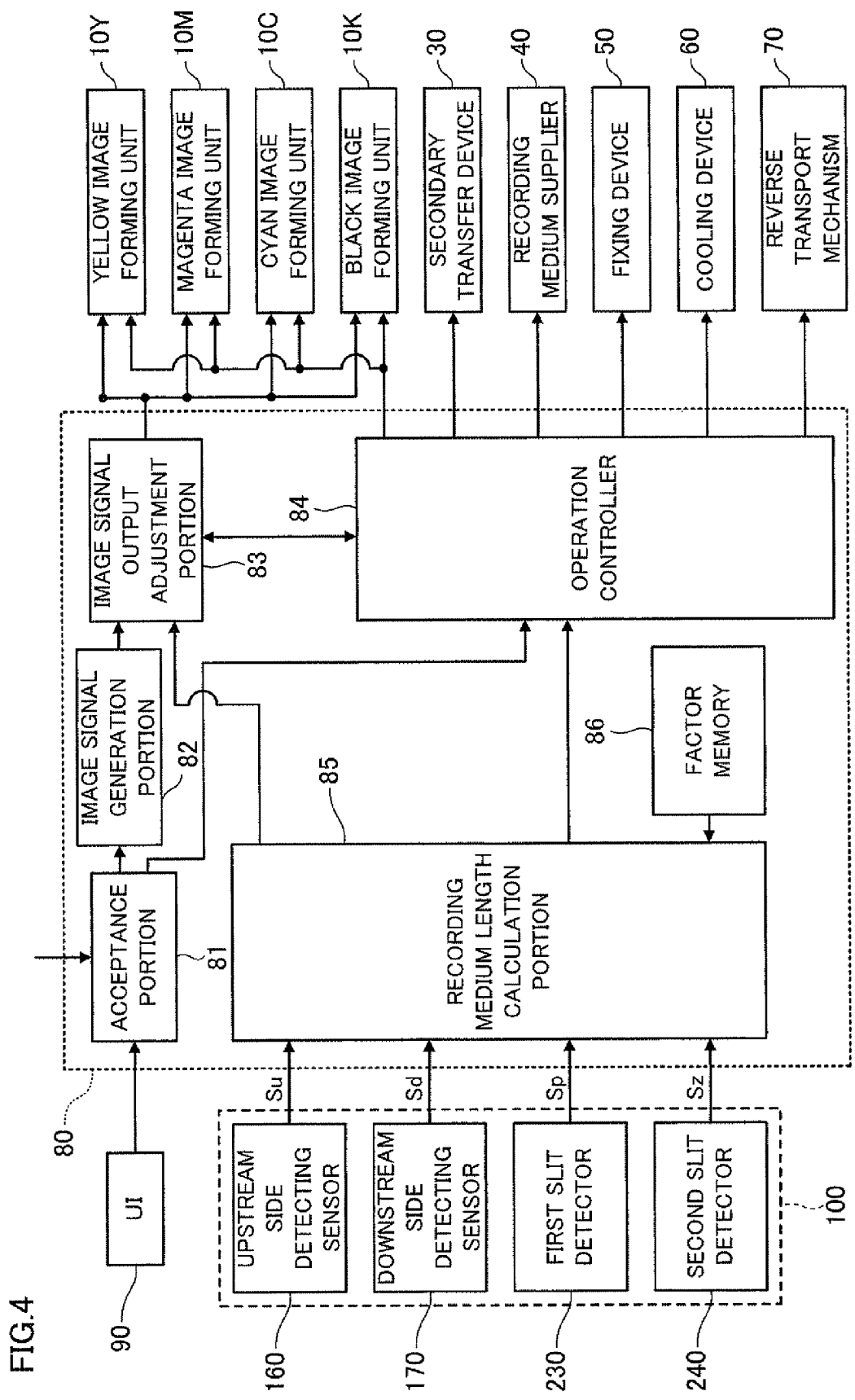
FIG. 4 is a block diagram illustrating an example of configuration of a controller of the image forming apparatus.

FIG. 4 is a block diagram illustrating an example of configuration of the controller 80 shown in FIG. 1. The controller 80 includes: an acceptance portion 81 that accepts instructions outputted from the UI 90 or an external appliances (not shown) connected to the image forming apparatus; and an image signal generation portion 82 that generates an image signal for each of yellow, magenta, cyan and black colors based on image data transmitted with print instructions when the print instructions are accepted via the acceptance portion 81. The controller 80 further includes an image signal output adjustment portion 83 that adjusts timing for outputting the image signal for each color generated by the image signal generation portion 82 to each of the image forming units 10 (more specifically, the exposure device 13 provided to each image forming unit 10), and also adjusts magnification of the image signal for each color generated by the image signal generation portion 82 in a slow scanning direction (a direction corresponding to the transport direction of the recording medium S). Moreover, the controller 80 includes an operation controller 84 that controls operations of each parts constituting the image forming apparatus, such as each image forming unit 10 (10Y, 10M, 10C and 10K), the secondary transfer device 30, the recording medium supplier 40, the fixing device 50, the cooling device 60 and the reverse transport mechanism 70.

Further, the controller 80 of the first exemplary embodiment includes a recording medium length calculation portion 85, as an example of a calculation unit, that calculates a recording medium length L, which is a length in the transport direction of the recording medium S (a length of a sheet in the transport direction) passing through the length measuring device 100, based on various signals inputted from the length measuring device 100. Here, the various signals inputted to the recording medium length calculation portion 85 includes: the upstream side edge signal Su inputted from the upstream side detecting sensor 160; the downstream side edge signal Sd inputted from the downstream side detecting sensor 170; the phase signal Sp inputted from the first slit detector 230; and the Z-phase signal Sz inputted from the second slit detector 240. The controller 80 also includes a factor memory 86 that stores various factors used in calculating the recording medium length L in the recording medium length calculation portion 85. The factor memory 86 stores: the gap G (refer to FIG. 2) in the length measuring device 100; the recording medium transport speed Vs (refer to FIG. 2) determined in advance in accordance with, for example, every type of the recording medium S; a unit moving length X that is an amount of movement of the circumferential surface of the length measuring device 110 per a single pulse count of the phase signal Sp; a correction coefficient α determined in advance for every type of the recording medium S and every environment, and so forth. The recording medium length L calculated in the recording medium length calculation portion 85 is outputted to the image signal output adjustment portion 83 to be used for output adjustment of an image signal, and outputted to the operation controller 84 to be used for controlling the operations of each part constituting the image forming apparatus.

The controller 80 includes a CPU (Central Processing Unit), a ROM (Read Only Memory), a RAM (Random Access Memory) or the like, and the CPU is configured to execute processing while exchanging data with the RAM in accordance with a program stored in the ROM in advance.

FIG. 5 is a flowchart illustrating an example of processing of the controller 80 in the case where image formation is carried out on both sides of the recording medium S using the image forming apparatus shown in FIG. 1. Hereinafter, description will be provided with reference to FIG. 5 and FIGS. 1 to 4.

When the acceptance portion 81 accepts instructions for printing request from the UI 90 or the external appliances (step 101), the operation controller 84 activates each part constituting the image forming apparatus to carry out a warm-up operation, and the image signal generation portion 82 generates an image signal of each color for the first surface corresponding to an image to be formed on the first surface of the recording medium S based on the image data being inputted. Then the operation controller 84 causes the recording medium supplier 40 to start supplying the recording medium S, and the image signal output adjustment portion 83 outputs the image signal of each color for the first surface generated by the image signal generation portion 82 to each image forming unit 10 (more specifically, the exposure device 13 provided in each of the image forming units 10) while synchronizing the image signal for the first surface and the supply timing of the recording medium S (step 102).

With these operations, in each image forming unit 10, an image (in the first exemplary embodiment, a toner image) corresponding to the image signal of each color for the first signal is formed. As will be described specifically, the operation controller 84 causes the photoconductor drum 11 of each image forming unit 10 to rotate, charges the rotating photoconductor drum 11 by the charging device 12, thereafter, exposes the photoconductor drum 11 with a beam corresponding to the image signal of each color for the first surface from the exposure device 13, thus forming an electrostatic latent image on the surface of the photoconductor drum 11. Next, the operation controller 84 causes the electrostatic latent image formed on each photoconductor drum 11 to be developed by the developing device 14 of each corresponding color, thus forming the image of each color for the first surface. Thereafter, the operation controller 84 causes the images for the first surface formed on the respective photoconductor drums 11 to be primarily transferred in sequence onto the intermediate transfer belt 20 which is rotated and driven together with the photoconductor drums 11 using the respective primary transfer devices 15 (step 103). The images for the first surface superimposed on the intermediate transfer belt 20 by the primary transfer are transported toward a secondary transfer position, which is a facing position between the secondary transfer roll 30 and the roll member 23, along with further rotation of the intermediate transfer belt 20.

On the other hand, the recording medium S supplied from the recording medium supplier 40 is transported by the transport rolls 43 and arrives at the secondary transfer position. The operation controller 84 causes the images for the first surface formed on the intermediate transfer belt 20 to be secondarily transferred onto the first surface of the recording medium S using the secondary transfer device 30 (step 104).

Next, the operation controller 84 applies, for example, heat and pressure to the recording medium S on the first surface of which the image is transferred by using the fixing device 50 to fix the image on the first surface to the recording medium S. Further, the operation controller 84 causes the recording medium S heated by the fixing device 50 to be cooled by the cooling device 60 (step 105).

The recording medium S with an image recorded on one side thereof, on the first surface of which the image is fixed, is transported from the cooling device 60 to the length measuring device 100. In the length measuring device 100, the first roll 110 and the second roll 120 are rotated along with the transportation of the recording medium S with the image recorded on one side thereof, and thereby the phase signal Sp corresponding to an amount of rotation of the second roll 120 is outputted from the first slit detector 230, and the Z-phase signal Sz corresponding to the amount of rotation of the second roll 120 is outputted from the second slit detector 240. Further, along with the transportation of the recording medium S with the image recorded on one side thereof, the upstream side edge signal Su is outputted from the upstream side detecting sensor 160 and the downstream side edge signal Sd is outputted from the downstream side detecting sensor 170. These various signals outputted from the length measuring device 100 are inputted to the recording medium length calculation portion 85. The recording medium length calculation portion 85 calculates the length L of the recording medium S with the image recorded on one side thereof passing the length measuring device 100 using the various signals inputted from the length measuring device 100 and various factors read from the factor memory 86 (step 106). Thereafter, the recording medium length calculation portion 85 outputs the calculated length L of the recording medium S to the image signal output adjustment portion 83 and the operation controller 84. The calculation method of the recording medium length L will be described in detail later.

Next, based on the recording medium length L received from the recording medium length calculation portion 85, the image signal output adjustment portion 83 calculates timing for outputting an image signal of each color for the second surface to be generated by the image signal generation portion 82 to the exposure device 13 provided to each of the image forming units 10 (namely, a starting position of writing on the photoconductor drum 11 by the exposure device 13) and a magnification (scaling amount) in the slow scanning direction of the image signal of each color for the second surface to be generated by the image signal generation portion 82 (step 107).

Meanwhile, the operation controller 84 switches the switching device 71 to the transport path for the reverse transportation before the leading edge of the recording medium S with the image recorded on one side thereof arrives, and causes the recording medium S entering into the reversing device 72 to exit while reversing the sides thereof by reversing the moving direction thereof. As a result, the recording medium S with the image recorded on one side thereof is reversely transported toward the transport path provided upstream of the secondary transfer device 30 in the transport direction by the reverse transport mechanism 70 (step 108).

The image signal generation portion 82 then generates the image signal of each color for the second surface corresponding to an image to be formed on the second surface of the recording medium S based on the image data being inputted. The operation controller 84 further transports the recording medium S with the image recorded on one side thereof being reversely transported, and the image signal output adjustment portion 83 adjusts the image signal of each color for the second surface generated by the image signal generation portion 82 in accordance with the starting position of writing and the scaling amount calculated in step 107, and then outputs the adjusted image signal to each of the image forming units 10 (more specifically, the exposure device 13 provided to each of the image forming units 10) while synchronizing the image signal to the supply timing of the recording medium S with the image recorded on one side thereof being reversely transported (step 109).

With the above operations, formation of an image corresponding to the image signal of each color for the second surface is performed in each image forming unit 10. As will be described specifically, the operation controller 84 causes the photoconductor drum 11 in each image forming unit 10 to rotate and causes the rotated photoconductor drum 11 to be charged by the charging device 12, and thereafter causes the photoconductor drum 11 to be exposed with a beam corresponding to the image signal of each color for the second surface from the exposure device 13, thus forming an electrostatic latent image on the surface of the photoconductor drum 11. Next, the operation controller 84 causes the electrostatic latent image formed on each photoconductor drum 11 to be developed by the developing device 14 of each corresponding color, thus forming the image of each color for the second surface. Thereafter, the operation controller 84 causes the images for the second surface formed on the respective photoconductor drums 11 to be primarily transferred in sequence onto the intermediate transfer belt 20 which is rotated and driven together with the photoconductor drums 11 using the respective primary transfer devices 15 (step 110). The images for the second surface superimposed on the intermediate transfer belt 20 by the primary transfer are transported toward the secondary transfer position along with further rotation of the intermediate transfer belt 20.

On the other hand, the recording medium S with the image recorded on one side thereof being reversely transported is further transported by the transport rolls 43 and arrives at the secondary transfer position again. The operation controller 84 causes the images for the second surface formed on the intermediate transfer belt 20 to be secondarily transferred onto the second surface of the recording medium S using the secondary transfer device 30 (step 111).

Next, the operation controller 84 applies, for example, heat and pressure to the recording medium S on the second surface of which the image is transferred by using the fixing device 50 to fix the image on the second surface to the recording medium S. Further, the operation controller 84 causes the recording medium S heated by the fixing device 50 to be cooled by the cooling device 60 (step 112).

The operation controller 84 switches the switching device 71 to the transport path for outputting the recording medium S to the outside of the image forming apparatus before the leading edge of the recording medium S with the images recorded on both sides thereof arrives, and causes the recording medium S with the images recorded on both sides thereof to exit to the outside of the image forming apparatus as being transported (step 113), thus completing a series of operations.

After the above-described double-sided image formation is carried out for plural recording media S, the plural recording media S, each of which has images formed on both sides, are bound to make one booklet. At this occasion, if there occur variations in the recording medium length L among the plural recording media S, since conditions for image formation such as the starting position of writing and the magnification in the slow scanning direction are adjusted based on the recording medium length L measured by the length measuring device 100, an amount of displacement in a recording position between the plural recording media S in a horizontal two-page spread or a vertical two-page spread is reduced, and thereby a booklet of high quality is made compared to a case where the adjustment to outputting of the image signal based on the recording medium length L is not performed.

It should be noted that, here, the displacement between the images formed on the first and second surfaces of the recording medium S is suppressed by performing the adjustment to outputting of the image signal for the second surface to be provided the exposure device 13 by the image signal output adjustment portion 83. However, the way to suppress the image displacement is not limited thereto. For example, the magnification of an image in the slow scanning direction may be adjusted by controlling the rotation speed of each of the photoconductor drums 11 relative to the moving speed of the intermediate transfer belt 20.

The calculation method of the length L of the recording medium S in the above-mentioned step 106 will be described.

FIG. 6A is a timing chart illustrating an example of relationship among: the roll speed Vr of the second roll 120 that rotates along with passing of the recording medium S; the upstream side edge signal Su outputted from the upstream side detecting sensor 160; the downstream side edge signal Sd outputted from the downstream side detecting sensor 170; the phase signal Sp outputted from the first slit detector 230; and the Z-phase signal Sz outputted from the second slit detector 240. FIG. 613 illustrates the relationship between the downstream side edge signal Sd and the phase signal Sp, while being enlarged, around a third time point tc that will be described later, and FIG. 6C illustrates the relationship between the upstream side edge signal Su and the phase signal Sp, while being enlarged, around a fourth time point td that will be described later. It should be noted that the roll speed Vr means the moving speed of the circumferential surface of the second roll 120.

During a first time period T1, in which the recording medium S has not entered to the length measuring device 100, since the recording medium S does not exist, each of the upstream side edge signal Su and the downstream side edge signal Sd is in the off state. Further, during the first time period T1, the roll speed Vr is 0 because the first roll 110 and the second roll 120 are at rest, and thereby the phase signal Sp and the Z-phase signal Sz maintain the off state. However, even when the second roll 120 is at rest, the phase signal Sp or the Z-phase signal Sz maintains the on state in some cases depending on positions of the first slits 221 or the second slit 222 provided on the slit circular plate 220.

Next, at a first time point to when the leading edge in the transport direction (hereinafter, simply referred to as "leading edge") of the recording medium S arrives at a detecting position of the upstream side detecting sensor 160, the upstream side edge signal Su turns from the off state to the on state. At this time, the downstream side edge signal Sd maintains the off state and the second roll 120 is still at rest (Vr=0), and accordingly, the phase signal Sp and the Z-phase signal Sz still maintain the off state.

At a second time point tb, which is a time point after a second time period T2 has elapsed from the first time point ta, when the leading edge of the recording medium S being transported arrives at a location facing the first roll 110, the first roll 110 starts to be rotated by the recording medium S, and thereby the second roll 120 also starts to be rotated. However, the roll speed Vr of the second roll 120 does not reach the recording medium transport speed Vs immediately, but gradually increases toward the recording medium transport speed Vs. Further, because the slit circular plate 220 starts to be rotated as the second roll 120 starts rotating, the phase signal Sp comes to alternately repeat the on state and the off state. It should be noted that, since the roll speed Vr is gradually increased as described above, the interval between the on state and the off state in the phase signal Sp is gradually reduced.

At the third time point tc, which is a time point after a third time period T3 has elapsed from the second time point tb, when the leading edge of the recording medium S being transported arrives at the detecting position of the downstream side detecting sensor 170, the downstream side edge signal Sd turns from the off state to the on state. At this time, the upstream side edge signal Su maintains the on state and the roll speed Vr of the second roll 120 has been increased up to the recording medium transport speed Vs by the third time point tc. Accordingly, at least after the third time point tc, the phase signal Sp periodically repeats the on state and the off state.

Further, after the slit circular plate 220 starts to rotate, the Z-phase signal Sz temporally turns from the off state to the on state every one rotation of the slit circular plate 220. It should be noted that FIG. 6A illustrates a case in which the Z-phase signal does not turns to the on state during the second time period T2, but turns to the on state for the first time after the third time point tc.

At the fourth time point td, which is a time point after a fourth time period T4 has elapsed from the third time point tc, when the trailing edge in the transport direction (hereinafter, simply referred to as "trailing edge") of the recording medium S arrives at the detecting position of the upstream side detecting sensor 160, the upstream side edge signal Su turns from the on state to the off state. At this time, the downstream side edge signal Sd maintains the on state and the roll speed Vr of the second roll 120 continues to maintain the recording medium transport speed Vs.

At a fifth time point te, which is a time point after a fifth rime period T5 has elapsed from the fourth time point td, the trailing edge of the recording medium S being transported passes through the location facing the first roll 110, and thereby the first roll 110 comes to receive no driving force from the from the recording medium S and the second roll 120 also comes to receive no driving force from the first roll 110. However, the roll speed Vr of the second roll 120 does not immediately become 0 (stop), but is gradually reduced from the recording medium transport speed Vs. Further, as the driving of the second roll 120 is stopped, the rotation speed of the slit circular plate 220 also starts to be reduced, thus gradually increasing the interval between the on state and the off state in the phase signal Sp.

At a sixth time point tf, which is a time point after a sixth time period T6 has elapsed from the fifth time point te, when the trailing edge in of the recording medium S being transported arrives at the detecting position of the downstream side detecting sensor 170, the downstream side edge signal Sd turns from the on state to the off state. At this time, the upstream side edge signal Su maintains the off state, and the roll speed Vr of the second roll 120 becomes 0 by the sixth time point tf, thus the second roll 120 stops.

During a seventh time period T7 after the recording medium S exits from the first roll 110, each of the upstream side edge signal Su and the downstream side edge signal Sd are in the off state because there is no recording medium S. Further, in the seventh time period T7, the roll speed Vr is 0 since the second roll 120 stops the rotation thereof, and accordingly, the phase signal Sp and the Z-phase signal Sz also maintain the off state. However, as described above, the phase signal Sp or the Z-phase signal Sz maintains the on state in some cases even though the second roll 120 is at rest.

Here, the third time point tc when the downstream side edge signal Sd turns from the off state to the on state does not necessarily coincide with a timing of transition of the phase signal Sp from the off state to the on state (hereinafter, referred to as rising) or a timing of transition from the on state to the off state (hereinafter, referred to as falling). Therefore, in the following description, a time period from the third time point tc to a downstream side lag time point tc0 when the phase signal Sp rises or falls for the first time after the third time point tc is referred to as a downstream side lag time period Tx as shown in FIG. 6B. It should be noted that FIG. 6B illustrates a case where the phase signal Sp falls at the downstream side lag time point tc0.

Further, the fourth time point td when the upstream side edge signal Su turns from the off state to the on state does not necessarily coincide with a timing of rising or falling of the phase signal Sp. Therefore, in the following description, a time period from an upstream side lag time point td0 when the phase signal Sp rises or falls for the last time before the fourth time point td to the fourth time point td to is referred to as an upstream side lag time period Ty as shown in FIG. 6C. It should be noted that FIG. 6C illustrates a case where the phase signal Sp falls at the upstream side lag time point td0.

Further, as shown in FIG. 6A, in the fourth time period T4 in which a single recording medium S being transported is detected by both upstream side detecting sensor 160 and downstream side detecting sensor 170, a period from turning of the Z-phase signal to the on state and next turning thereof to the on state again is referred to as a rotation period Tr. The rotation period Tr means a period of a single rotation of the slit circular plate 220 caused by a single rotation of the second roll 120 whose roll speed Vr is set to the recording medium transport speed Vs.

Figure 7:
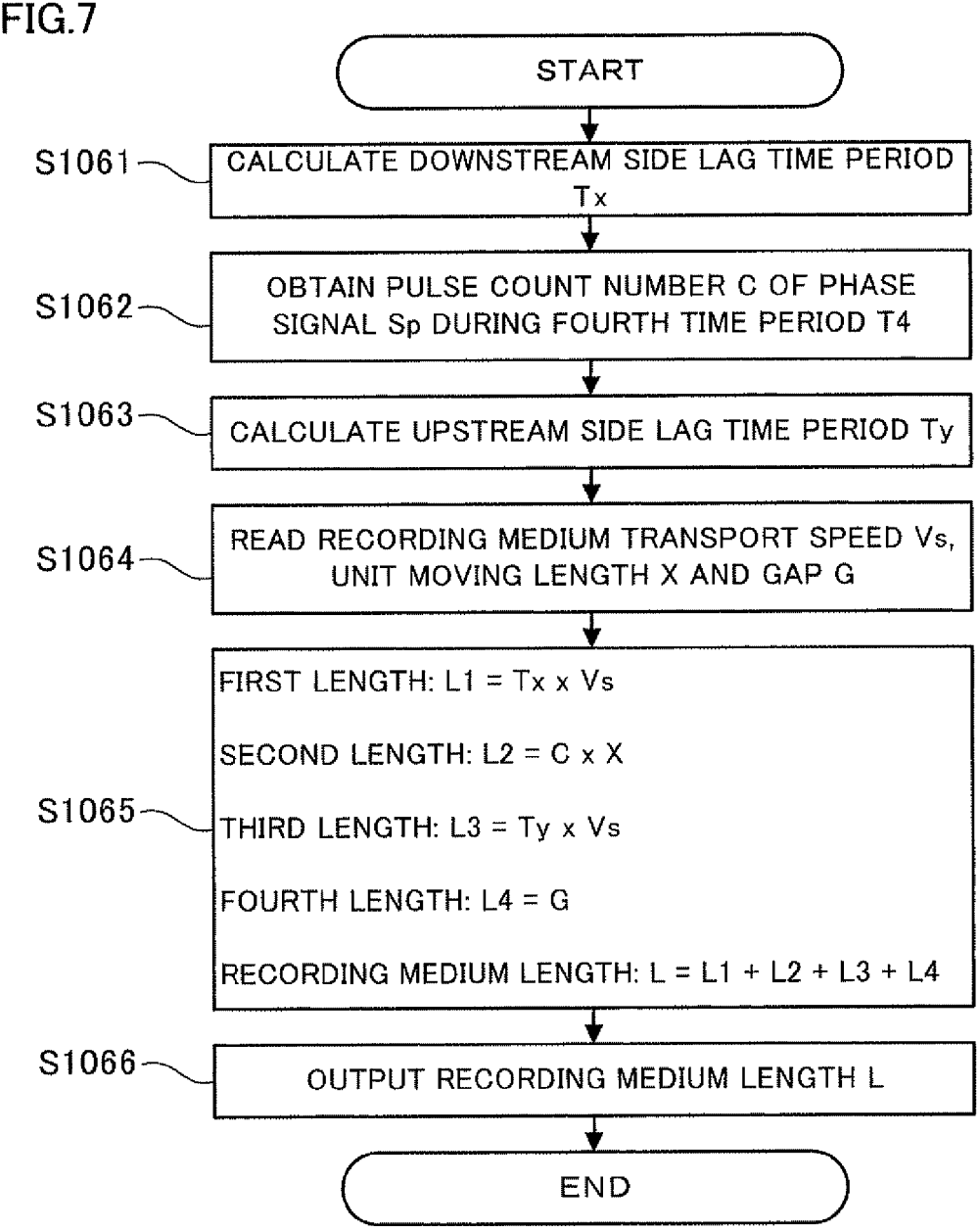
FIG. 7 is a flowchart illustrating an example of processing for calculating a length of the recording medium.
Figure 8:
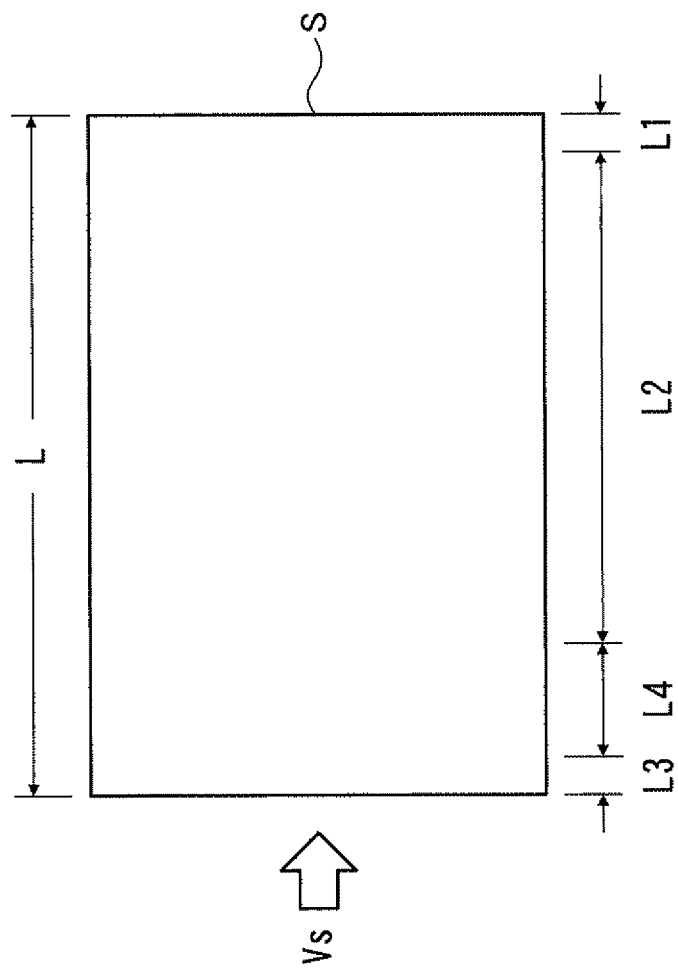
FIG. 8 illustrates the length of the recording medium being transported and a relationship among a first length, a second length, a third length and a fourth length in the length of the recording medium.

FIG. 7 is a flowchart illustrating an example of processing for calculating the recording medium length L in the recording medium length calculation portion 85 shown in FIG. 4. FIG. 8 illustrates relationship among a first length L1, a second length L2, a third length L3 and a fourth length L4 in the recording medium length L. It should be noted that FIG. 8 exemplifies a case where the correction coefficient α, which will be described later, is 1. Details of the first length L1 to the fourth length L4 will be described later.

The recording medium length calculation portion 85 first obtains the third time point tc and the downstream side lag time point tc0 from the downstream side edge signal Sd and the phase signal Sp, and calculates the downstream side lag time period Tx from the third time point tc and the downstream side lag time point tc0 (step 1061).

Next, the recording medium length calculation portion 85 obtains the third time point tc and the fourth time point td from the upstream side edge signal Su and the downstream side edge signal Sd, and further obtains the fourth time period T4 from the third time point tc and the fourth time point td, and then obtains, with reference to the phase signal Sp, a pulse count number C that is the number of times the phase signal Sp rises during the time period T4 (step 1062), Subsequently, the recording medium length calculation portion 85 obtains the fourth time point td and the upstream side lag time point td0 from the upstream side edge signal Su and the phase signal Sp, and calculates the upstream side lag time period Ty from the fourth time point td and the upstream side lag time point td0 (step 1063).

Then the recording medium length calculation portion 85 reads the recording medium transport speed Vs, the unit moving length X, the gap G and the correction coefficient α from the factor memory 86 (step 1064). At this occasion, the recording medium length calculation portion 85 reads the recording medium transport speed Vs and the correction coefficient α corresponding to the type of the recording medium S to be measured.

Thereafter, the recording medium length calculation portion 85 calculates each of the first length L1, the second length L2, the third length L3 and the fourth length L4, and then calculates the recording medium length L by adding the obtained first length L1 to fourth length L4 and multiplying the result of addition by the correction coefficient α (step 1065). Here, the first length L1 is obtained by multiplying the downstream side lag time period Tx calculated in step 1061 by the recording medium transport speed Vs read in step 1064. The second length L2 is obtained by multiplying the pulse count number C obtained in step 1062 by the unit moving length X read in step 1064. Further, the third length L3 is obtained by multiplying the upstream side lag time period Ty obtained in step 1063 by the recording medium transport speed Vs read in step 1064. Still further, the fourth length L4 is the gap G read in step 1064.

The recording medium length calculation portion 85 then outputs the recording medium length L calculated in step 1065 to the image signal output adjustment portion 83 and the operation controller 84 (step 1066), thus completing the series of processes.

In the length measuring device 100 of the first exemplary embodiment, increase of the contact area between the first roll 110 and the recording medium S and a frictional force therebetween are sought by pressing the first roll 110 having the surface layer 112 made of an elastic body against the recording medium S to cause the first roll 110 and the recording medium S to be in contact with each other. Thus, it is intended to reduce an error in the calculation of the recording medium length L due to a slippage of the first roll 110 against the recording medium S being transported.

On the other hand, in the case where the first roll 110 configured as such is brought into contact with the recording medium S by being pressed against the recording medium S, the circumferential length of the first roll 110 varies owing to deformation of the surface layer 112 of the first roll 110. Further, the first roll 110 with such a configuration is likely to expand or contract by temperature change, and thereby the circumferential length of the first roll 110 varies as the ambient temperature changes. For this reason, if, for example, the rotation amount detector 200 is attached to the first rotation axis 110a of the first roll 110, an error caused by the variation of the circumferential length of the first roll 110 tends to be included in the recording medium length L.

Meanwhile, in the first exemplary embodiment, the second roll 120 is further pressed against the first roll 110 made of an elastic body to be brought into contact therewith, and the second rotation axis 120a of the second roll 120, which rotates along the rotation of the first roll 110, is attached to the rotation amount detector 200. In the first exemplary embodiment, the second roll 120 is configured with a metal that is harder than and less likely to thermally expand compared to the material of the first roll 110, thus absorbing the variation in the circumferential length of the first roll 110 due to deformation thereof by the second roll 120. The rotation amount detector 200 detects the amount of rotation after the variation of the circumferential length of the first roll 110 is absorbed, thereby reducing the error in calculation of the recording medium length L due to the deformation of the first roll 110.

In the first exemplary embodiment, curling occurs in some cases in the recording medium S, with an image recorded on one side, to pass through the length measuring device 100. Such curling occurs in the recording medium S from the time when contained in the recording medium supplier 40, occurs in fixing the image onto the recording medium S in the fixing device 50, or in cooling the recording medium S, on which the image has been fixed, in the cooling device 60.

Here, a case will be considered, in which curling in a trailing edge side is larger than that in a leading edge side in the transport direction of a single recording medium S.

The above-described FIG. 2 also illustrates a state immediately after the leading edge in the transport direction of the recording medium S, in which curling occurs, enters the portion facing the first roll 110 in the length measuring device 100. Hereinafter, a distance between the first swing axis 132 of the first lever 133 and the first rotation axis 110a of the first roll 110 is referred to as a first distance D1, and a distance between the first swing axis 132 and the second rotation axis 120a of the second roll 120 is referred to as a second distance D2.

Figure 9:
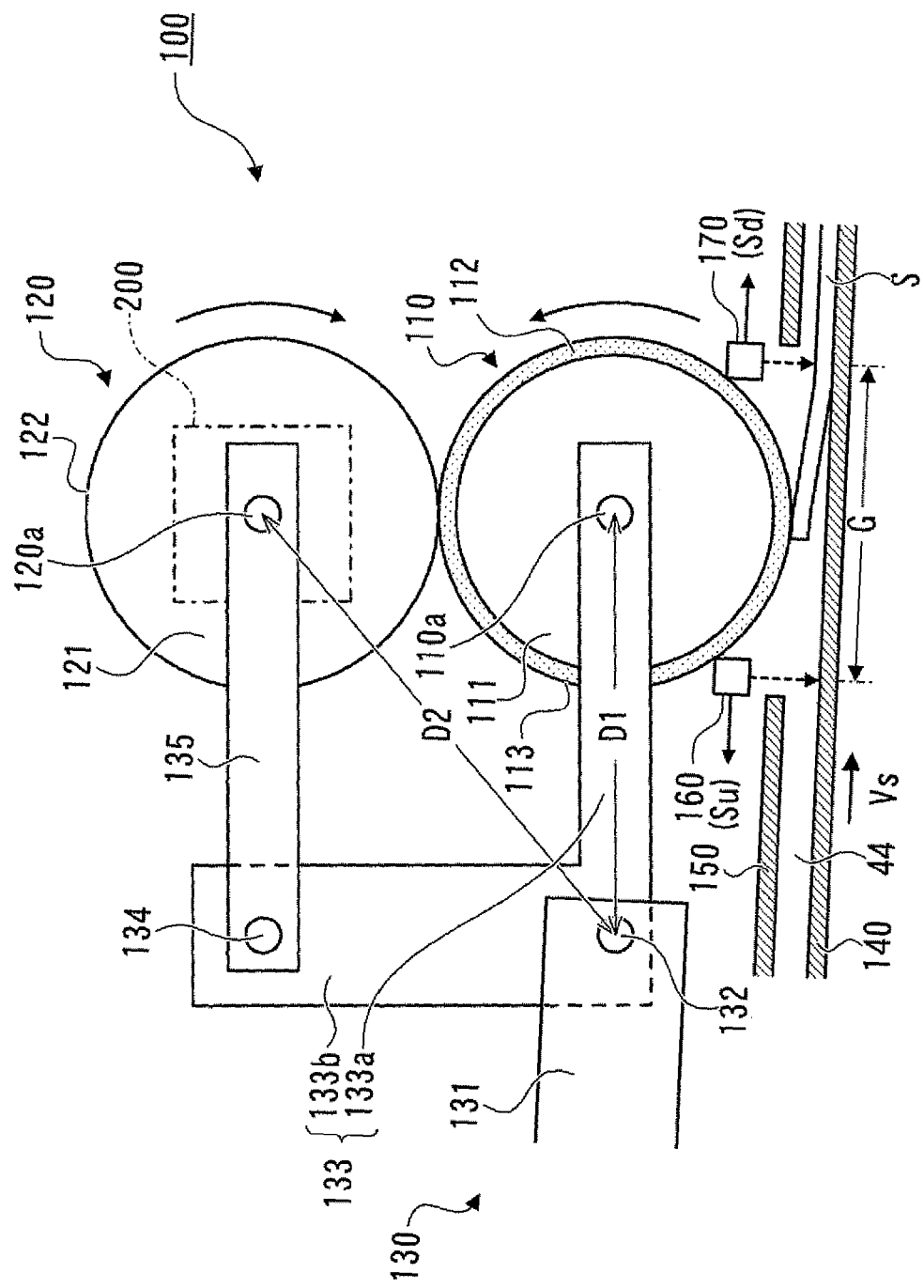
FIG. 9 illustrates a state immediately before a trailing edge in a transport direction of the recording medium, in which curling occurs, passes through a portion facing a first roll in the length measuring device.

On the other hand, FIG. 9 illustrates a state immediately before the trailing edge in the transport direction of the recording medium S, in which the curling occurs, passes through the portion facing the first roll 110 in the length measuring device 100. In the state shown in FIG. 9, the first roll 110 receives a force in a direction away from the transport path 44 due to the curling of the recording medium S. Thereby, the first rotation axis 110a provided to the first roll 110 is moved by the first lever 133 in the counterclockwise direction in the figure around the first swing axis 132, and accordingly, the first roll 110 comes to a state of floating above the transport path 44 compared to the state as shown in FIG. 2. The second roll 120 coming into contact with the first roll 110 is moved in the counterclockwise direction in the figure, similar to the first roll 110, along with the swing movement of the first roll 110. On this occasion, the second lever 135 that supports the second rotation axis 120a of the second roll 120 swings together with the first lever 133 since the second lever 135 is connected to the first lever 133, to which the first roll 110 is attached, via the second swing axis 134. Consequently, in the first exemplary embodiment, even in the state where the first roll 110 and the second roll 120 are raised to higher positions by the curling of the recording medium S, the first distance D1 between the first swing axis 132 and the first rotation axis 110a and the second distance D2 between the first swing axis 132 and the second rotation axis 120a maintain the state as shown in FIG. 2.

If, for example, a configuration in which the first rotation axis 110a of the first roll 110 and the second rotation axis 120a of the second roll 120 are held to be individually swingable is employed, the second distance D2 varies with respect to the first distance D1 depending on the curling of the recording medium S. In the case where the second distance D2 varies with respect to the first distance D1, there occurs a displacement in the contact location between the first roll 110 and the second roll 120 corresponding to the amount of variation. If such displacement occurs, an error due to the displacement is included in the recording medium length L obtained based on the rotation amount of the second roll 120 detected by the rotation amount detector 200.

In contrast, in the first exemplary embodiment, the first lever 133 swinging around the first swing axis 132 rotatably supports the first roll 110, and the second lever 135 swinging with respect to the first lever 133 around the second swing axis 134 rotatably supports the second roll 120. In other words, the first lever 133 directly supports the first roll 110 and indirectly supports the second roll 120. Therefore, even in the case where the positions of the first roll 110 and the second roll 120 with respect to the transport path 44 are different between the leading edge side and the trailing edge side of the recording medium S due to the curling of the recording medium 5, occurrence of relative positional displacement between the circumferential surfaces of the first roll 110 and the second roll 120 is suppressed. Consequently, it is possible to reduce the error included in the data (here, the pulse count number C of the phase signal Sp in the fourth time period T4) related to the recording medium length L obtained via the first roll 110 and the second roll 120, thus making it possible to reduce the error included in the recording medium length L obtained as a result. The reduction of the error included in the recording medium length L results in that the positional displacement between the image of the first surface and the image of the second surface in duplex image forming may be reduced.

<Second Exemplary Embodiment>

The second exemplary embodiment is different from the first exemplary embodiment in the configuration of the support mechanism for the first roll 110 and the second roll 120 in the length measuring device 100. In the second exemplary embodiment, the same reference numerals will be applied to like parts as those of the first exemplary embodiment, and detailed description thereof will be omitted.

Figure 10:
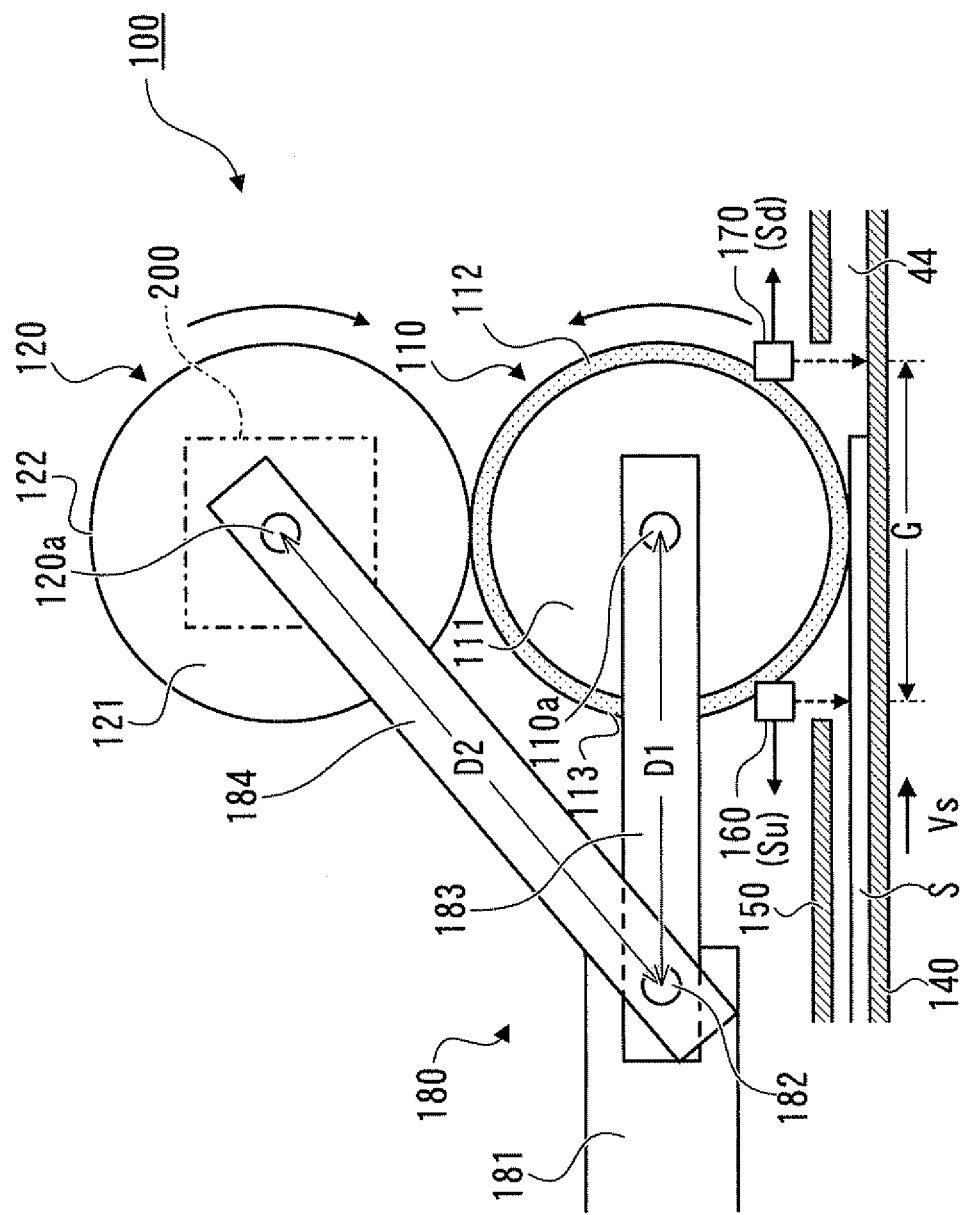
FIG. 10 illustrates an example of a configuration of the length measuring device used in a second exemplary embodiment.

FIG. 10 illustrates an example of a configuration of the length measuring device 100 used in the second exemplary embodiment.

The length measuring device 100 includes: the first roll 110 that rotates, above the transport path 44, around the first rotation axis 110a; the second roll 120 that rotates, above the first roll 110, around the second rotation axis 120a while being in contact with the first roll 110; a support mechanism 180 that supports the first roll 110 and the second roll 120; and the rotation amount detector 200 that is attached to the second rotation axis 120a of the second roll 120 and detects the rotation amount of the second roll 120.

The support mechanism 180 in the second exemplary embodiment includes a first lever 183 that swings around a common swing axis 182 extending in the same direction as the first rotation axis 110a and the second rotation axis 120a, the common swing axis 182 being provided upstream of the first roll 110 in the transport direction of the recording medium S and above the transport path 44, and a second lever 184. The common swing axis 182, as an example of the first axis and the second axis, is swingably supported by the support body 131 fastened to a housing (not shown in the figure) of the length measuring device 100. On a top end side of the first lever 183 as an example of the first support member, the first rotation axis 110a of the first roll 110 is rotatably attached. On the other hand, on a top end side of the second lever 184 as an example of the second support member, the second rotation axis 120a of the second roll 120 is rotatably attached.

Hence, the first roll 110 is configured to swing around the common swing axis 182 via the first lever 183. The second roll 120 is configured to swing around the common swing axis 182 via the second lever 184. Accordingly, in the length measuring device 100 in the second exemplary embodiment, the first roll 110 and the second roll 120 are configured to swing around the common swing axis 182.

In the second exemplary embodiment, a spring (not shown in the figure) is provided to the second lever 184 to apply a force in the clockwise direction in the figure around the common swing axis 182. In the second exemplary embodiment, by application of the force to the second lever 184 by the spring, the second roll 120 attached to the second lever 184 is pressed against the first roll 110, and the first roll 110 is pressed against the transport path 44 (and the recording medium S transported inside the transport path 44). In the second exemplary embodiment, similar to the first exemplary embodiment, the first roll 110 comes into contact with the recording medium S being transported, and thereby the first roll 110 rotates to follow the movement of the recording medium S. The second roll 120 is brought into contact with the first roll 110, thus causing the second roll 120 to rotate to follow the rotation of the first roll 110. The rotation amount detector 200 detects an amount of rotation of the second roll 120.

Here, same as the first exemplary embodiment, the case will be considered, in which curling in the trailing edge side is larger than that in the leading edge side in the transport direction of the single recording medium S.

The above-described FIG. 10 also illustrates a state immediately after the leading edge in the transport direction of the recording medium 5, in which curling occurs, enters the portion facing the first roll 110 in the length measuring device 100. Hereinafter, a distance between the common swing axis 182 of the first lever 183 and the first rotation axis 110a of the first roll 110 is referred to as a first distance D1, and a distance between the common swing axis 182 and the second rotation axis 120a of the second roll 120 is referred to as a second distance D2.

Figure 11:
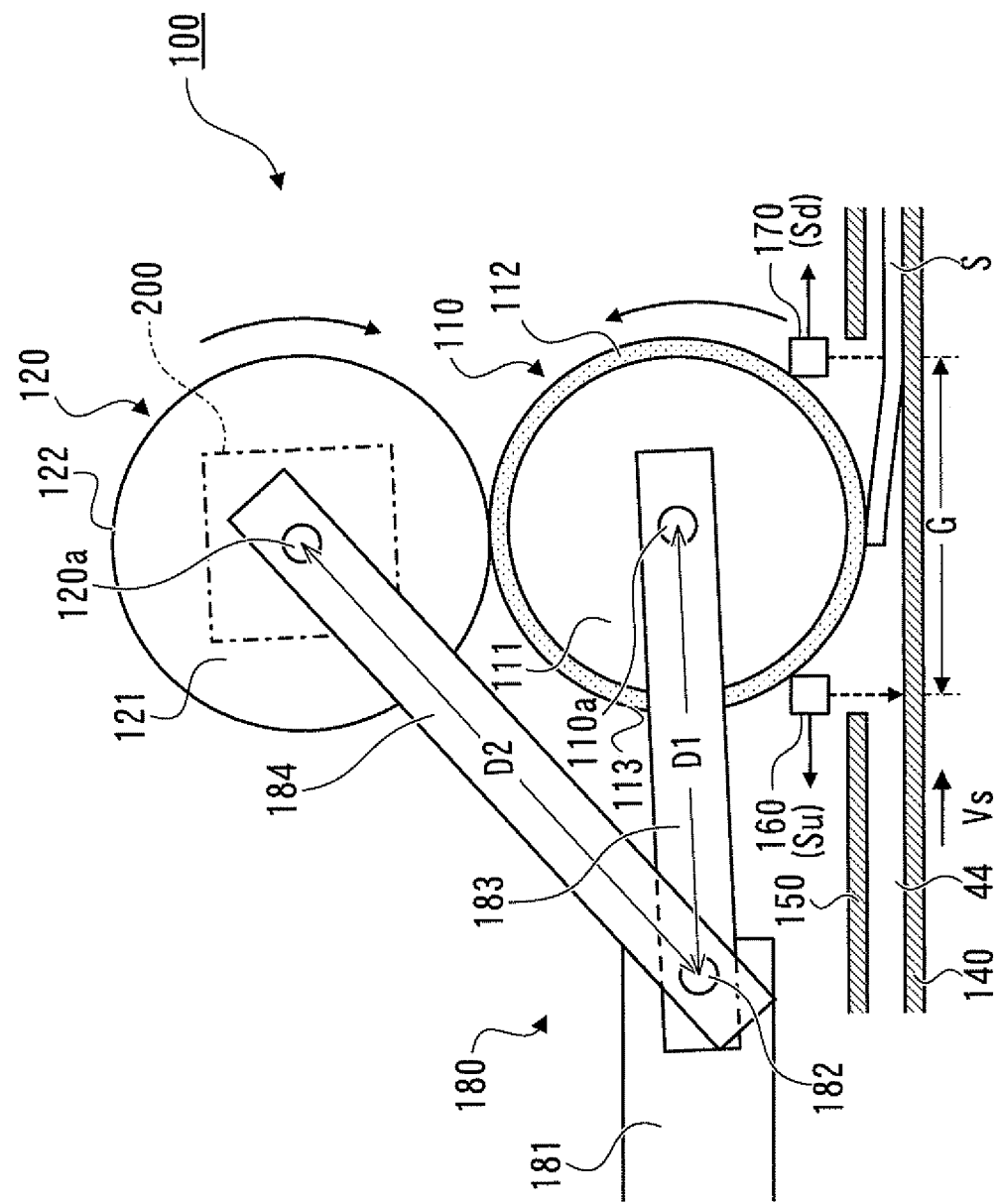
FIG. 11 illustrates a state immediately before a trailing edge in the transport direction of the recording medium, in which curling occurs, passes through the portion facing the first roll in the length measuring device.

On the other hand, FIG. 11 illustrates a state immediately before the trailing edge in the transport direction of the recording medium S, in which the curling occurs, passes through the portion facing the first roll 110 in the length measuring device 100. In the state shown in FIG. 11, the first roll 110 receives a force in a direction away from transport path 44 due to the curling of the recording medium S. Thereby, the first rotation axis 110a provided to the first roll 110 swings in the counterclockwise direction in the figure around the common swing axis 182 of the first lever 183, and accordingly, the first roll 110 comes to a state of floating above the transport path 44 compared to the state as shown in FIG. 10. The second roll 120 coming into contact with the first roll 110 is moved in the counterclockwise direction in the figure, similar to the first roll 110, along with the swing movement of the first roll 110. On this occasion, the second lever 184 that supports the second rotation axis 120a of the second roll 120 swings around the common swing axis 182, which is also the center of swinging of the first lever 183 that supports the first rotation axis 110a of the first roll 110. Consequently, in the second exemplary embodiment, even in the state where the first roll 110 and the second roll 120 are raised to higher positions by the curling of the recording medium S, the first distance D1 between the common swing axis 182 and the first rotation axis 110a and the second distance D2 between the common swing axis 182 and the second rotation axis 120a maintain the state as shown in FIG. 10.

Therefore, also in the second exemplary embodiment, occurrence of relative positional displacement between the circumferential surfaces of the first roll 110 and the second roll 120 caused by the swing movement of both rolls is suppressed. Consequently, it is possible to reduce the error included in the data (here, the pulse count number C of the phase signal Sp in the fourth time period T4) related to the recording medium length L obtained via the first roll 110 and the second roll 120, thus making it possible to reduce the error included in the recording medium length L obtained as a result. The reduction of the error included in the recording medium length L results in that the positional displacement between the image of the first surface and the image of the second surface in duplex image forming may be reduced.

It should be noted that, in the first and second exemplary embodiments, the description is made of the case where the curling in the trailing edge side is larger than that in the leading edge side in the transport direction of the single recording medium S. However, for example, in the case where the curling in the leading edge side is larger than that in the trailing edge side, the same result is obtained.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A rotation amount detecting device for a rotation body, comprising:
    a first rotation body provided with a first circumferential surface portion being in contact with a sheet being transported, the first rotation body rotating along with transportation of the sheet;
    a second rotation body provided with a second circumferential surface portion formed of a material different from a material forming the first circumferential surface portion and being in contact with the first circumferential surface portion, the second rotation body rotating along with rotation of the first rotation body;
    a first support member that rotatably supports the first rotation body at a first support position and swingably supports the first rotation body to swing around a first axis provided at a position different from the first support position of the first rotation body;
    a second support member that rotatably supports the second rotation body at a second support position and swingably supports the second rotation body to swing around a second axis provided at a position different from the second support position of the second rotation body, the second axis being any one of an axis provided to the first support member other than the first axis and an axis that is the same as the first axis; and
    a detector that detects an amount of rotation of the second rotation body.

2. A length measuring device comprising:
    a first rotation body provided with a first circumferential surface portion being in contact with a sheet being transported, the first rotation body rotating along with transportation of the sheet;
    a second rotation body provided with a second circumferential surface portion formed of a material different from a material forming the first circumferential surface portion and being in contact with the first circumferential surface portion, the second rotation body rotating along with rotation of the first rotation body;
    a first support member that rotatably supports the first rotation body at a first support position and swingably supports the first rotation body to swing around a first axis provided at a position different from the first support position of the first rotation body;
    a second support member that rotatably supports the second rotation body at a second support position and swingably supports the second rotation body to swing around a second axis provided at a position different from the second support position of the second rotation body, the second axis being any one of an axis provided to the first support member other than the first axis and an axis that is the same as the first axis;
    a detector that detects an amount of rotation of the second rotation body; and
    a calculation unit that calculates a length of the sheet in a transport direction of the sheet based on the amount of rotation of the second rotation body detected by the detector.

3. The length measuring device according to claim 2, wherein the material forming the second circumferential surface portion of the second rotation body has a lower thermal coefficient of expansion than the material forming the first circumferential surface portion of the first rotation body.

4. The length measuring device according to claim 3, wherein the material forming the second circumferential surface portion of the second rotation body is a metal and the material forming the first circumferential surface portion of the first rotation body is an elastic body.

5. The length measuring device according to claim 4, wherein both of the first axis and the second axis are provided upstream of a contact position between the first rotation body and the sheet in the transport direction of the sheet.

6. The length measuring device according to claim 3, wherein both of the first axis and the second axis are provided upstream of a contact position between the first rotation body and the sheet in the transport direction of the sheet.

7. The length measuring device according to claim 2, wherein the material forming the second circumferential surface portion of the second rotation body is a metal and the material forming the first circumferential surface portion of the first rotation body is an elastic body.

8. The length measuring device according to claim 7, wherein both of the first axis and the second axis are provided upstream of a contact position between the first rotation body and the sheet in the transport direction of the sheet.

9. The length measuring device according to claim 2, wherein both of the first axis and the second axis are provided upstream of a contact position between the first rotation body and the sheet in the transport direction of the sheet.

10. An image forming apparatus comprising:
    a first rotation body provided with a first circumferential surface portion being in contact with a sheet being transported, the first rotation body rotating along with transportation of the sheet;
    a second rotation body provided with a second circumferential surface portion formed of a material different from a material forming the first circumferential surface portion and being in contact with the first circumferential surface portion, the second rotation body rotating along with rotation of the first rotation body;
    a first support member that rotatably supports the first rotation body at a first support position and swingably supports the first rotation body to swing around a first axis provided at a position different from the first support position of the first rotation body;
    a second support member that rotatably supports the second rotation body at a second support position and swingably supports the second rotation body to swing around a second axis provided at a position different from the second support position of the second rotation body, the second axis being any one of an axis provided to the first support member other than the first axis and an axis that is the same as the first axis;
    a detector that detects an amount of rotation of the second rotation body;

a calculation unit that calculates a length of the sheet in a transport direction of the sheet based on the amount of rotation of the second rotation body detected by the detector; and an image forming unit that forms an image on the sheet based on the length of the sheet in the transport direction of the sheet calculated by the calculation unit.

11. The image forming apparatus according to claim 10, wherein the material forming the second circumferential surface portion of the second rotation body has a lower thermal coefficient of expansion than the material forming the first circumferential surface portion of the first rotation body.

12. The image forming apparatus according to claim 11, wherein the image forming unit forms an image on one side of the sheet and also forms an image on the other side of the sheet having been inverted, the image forming unit adjusting, when forming the image on the other side of the sheet, an image forming condition based on the length in the transport direction of the sheet with the image formed on the one side of the sheet.

13. The image forming apparatus according to claim 10, wherein the image forming unit forms an image on one side of the sheet and also forms an image on the other side of the sheet having been inverted, the image forming unit adjusting, when forming the image on the other side of the sheet, an image forming condition based on the length in the transport direction of the sheet with the image formed on the one side of the sheet.

\* \* \* \* \*